(12) United States Patent
Burks et al.

(10) Patent No.: US 7,617,319 B2
(45) Date of Patent: Nov. 10, 2009

(54) METHOD AND SYSTEM FOR OPTIMIZING TRANSCODER RESOURCES

(75) Inventors: Janus P. Burks, Richland Hill, TX (US); Jack A. Gipson, Fort Worth, TX (US); Joseph C. Sligo, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 917 days.

(21) Appl. No.: 11/174,361

(22) Filed: Jun. 30, 2005

(65) Prior Publication Data

US 2007/0002865 A1    Jan. 4, 2007

(51) Int. Cl.
*G06F 15/16* (2006.01)
(52) U.S. Cl. .................. 709/228; 709/203; 709/204; 709/230
(58) Field of Classification Search ......... 709/203–205, 709/227, 228, 230
See application file for complete search history.

(56) References Cited

U.S. PATENT DOCUMENTS

| 7,111,049 | B1 * | 9/2006 | Granger et al. ............... 709/216 |
| 2003/0229699 | A1 | 12/2003 | Moran et al. |
| 2004/0047437 | A1 * | 3/2004 | Hamiti et al. ............... 375/326 |
| 2004/0139088 | A1 | 7/2004 | Mandato et al. |
| 2006/0291447 | A1 * | 12/2006 | Siliquini et al. ............. 370/352 |

* cited by examiner

*Primary Examiner*—David Lazaro

(57) ABSTRACT

A method and system (500) for optimizing transcoder resources in a multimedia session is disclosed. The method includes receiving (202) one or more SDP offers. The method further includes filtering (204) out media types from each of the one or more SDP offers based on a rating range. Further, the method includes selecting (206) one of the media types from each of the one or more SDP offers. The method further includes allocating (208) resources of one or more transcoders for transcoding the one of the media types.

13 Claims, 3 Drawing Sheets

METHOD AND SYSTEM FOR OPTIMIZING TRANSCODER RESOURCES

FIELD OF THE INVENTION

This invention relates in general to multimedia sessions, and more specifically, to the selection of a media type in multimedia sessions.

BACKGROUND OF THE INVENTION

Nowadays, telecommunication networks are rapidly changing with the increasing use of multimedia applications over fixed and wireless networks. Multimedia applications include voice over Internet protocol (VoIP) applications, video conferencing, and messaging. VoIP is a technology that allows voice calls to be transmitted via the Internet, using a broadband connection. VoIP calls can be made over a wireless network by using a VoIP service provider. While a VoIP call connection is being made, the call needs to traverse through multiple IP networks. As a result, VoIP service providers supporting IP peering capabilities need to support high-layer application-level protocols for services such as VoIP. Session Initiation Protocol (SIP) is one such application-layer control protocol that addresses call set up and termination, error handling, and interprocess signaling. SIP also initiates, modifies, and terminates multimedia sessions, including conferences, Internet telephony, distance learning, and other applications.

There are a number of inter-carrier network problems that arise when voice calls are transferred between IP networks. Specifically, issues pertaining to media coder-decoder (codec) incompatibility between the source and destination of VoIP become a problem in larger cross-carrier networks. Due to the complex interconnection between networks, support for media and codec transcoding functions is essential.

As the use of VoIP becomes more widespread, service providers are required to support different types of VoIP media streams, which include uncompressed and compressed codecs. Different types of VoIP media streams have a different voice quality. To support different types of VoIP media streams, transcoders are required to convert media stream from one format to another. Two key aspects are associated with a transcoder—resource usage for transcoding, and resource usage for storing. The resource usage for transcoding relates to the use of bandwidth and the number of channels required to support each media type in the call. Hence, it is important for the service providers to optimize the use of transcoder resources while maintaining a good voice quality.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF THE INVENTION

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

A detailed description of an exemplary application, namely 'Method and System for Optimizing Transcoder Resources', is provided as a specific enabling disclosure that may be generalized to any application of the disclosed system, device and method for optimizing transcoder resources in accordance with various embodiments of the present invention.

Figure 1:
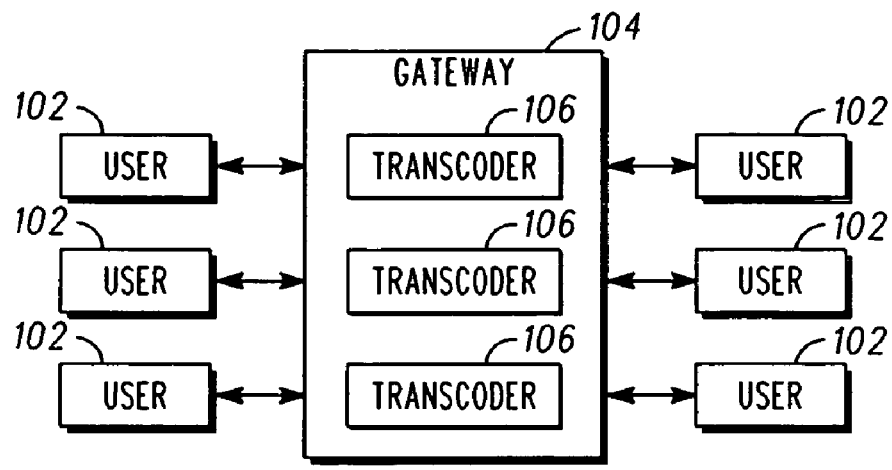
FIG. 1 representatively illustrates a block diagram of a conference call amongst a plurality of users communicating through a gateway, in accordance with an exemplary embodiment of the present invention.

FIG. 1 representatively illustrates a block diagram of a conference call, showing a gateway 104 and a plurality of users 102 communicating through the gateway 104, in accordance with an exemplary embodiment of the present invention. The gateway 104 includes a plurality of transcoders 106. The plurality of users 102 communicate with each other by establishing multimedia sessions, using the gateway 104. The multimedia sessions may include Internet multimedia conferences, Internet telephone calls and multimedia distribution. A multimedia session between the plurality of users 102 is established by using a Session Initiation Protocol (SIP). SIP is an application-layer signaling protocol that can establish, modify and terminate the multimedia sessions. SIP uses a Session Description Protocol (SDP) offer to describe each multimedia session. The SDP offer includes information related to the media types supported by a user from the plurality of users 102. During the establishment of the multimedia session, one media type is chosen from the SDP offer, for each user from the plurality of users 102. Based on selection of the one media type, resources of one or more transcoders from the plurality of transcoders 106 are allocated. The transcoder 106 converts a media type from one format to another format. Once a media type for each user from the plurality of users 102 is chosen, the multimedia session is established.

Figure 2:
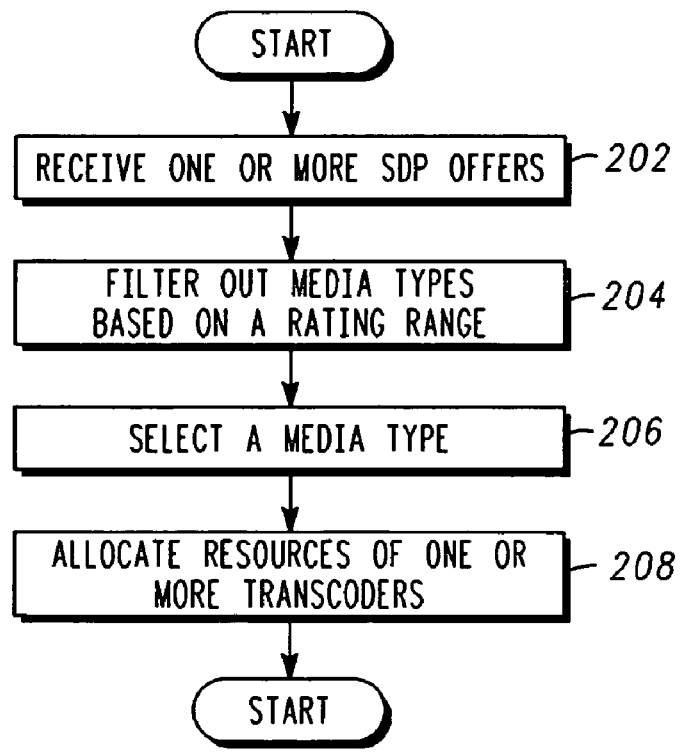
FIG. 2 representatively illustrates a flowchart depicting a method for optimizing transcoder resources in a multimedia session, in accordance with a first exemplary embodiment of the present invention.

FIG. 2 representatively illustrates a flowchart depicting a method for optimizing transcoder resources in a multimedia session, in accordance with a first exemplary embodiment of the present invention. At step 202, one or more SDP offers are received. The one or more SDP offers include one SDP offer each from the plurality of users 102. Each SDP offer lists different media types supported by a user from the plurality of users 102. Examples of formats of the media types include the Selection Mode Vocoder (SMV), the Enhanced Variable Rate Coder (EVRC), the Vector Sum Excited Linear Prediction (VSELP), the Codebook Excited Linear Prediction (CELP), the Linear Predictive Coding (LPC), the Residual Pulse Excitation (RPE), the Mixed Excitation Linear Prediction (MELP), the Long Term Prediction (LTP), the Multi Pulse Excited Linear Prediction (MPELP) and the Adaptive Multi-rate (AMR).

Each media type is given a rating. In an embodiment of the present invention, the rating is a Mean Opinion Score (MOS) rating. The MOS rating is a measure of the audio clarity of a voice call. The MOS rating ranges from 1 to 5, where 5 is the highest quality level. In another embodiment of the present invention, the rating is a vocoder voice quality rating. At step 204, media types are filtered out from each of the one or more SDP offers, based on a rating range. The rating range is set using an Acceptable Voice Quality Degradation (AVQD) factor. The media types that are not within the AVQD factor from a highest rated media type are filtered out. In an embodiment of the invention, the highest rated media type is the media type with the highest MOS rating. The AVQD factor is configurable. In an embodiment of the present invention, the AVQD factor is decreased in order to produce a high voice quality. A low AVQD factor eliminates media types that have a low MOS rating. In another embodiment of the present invention, the AVQD factor is increased in order to reduce the usage of the transcoder's resources.

The filtering of media types may further include removing unsupported media types from each of the one or more SDP offers. The media types in each of the one or more SDP offers may then be sorted based on the rating of the media types.

Thereafter, at step 206, one of the media types is selected from each of the one or more SDP offers. After selecting one of the media types at step 206, resources of one or more transcoders from the plurality transcoders 106 are allocated, at step 208. The one or more transcoders convert the media type from one format to another format.

Figure 3:
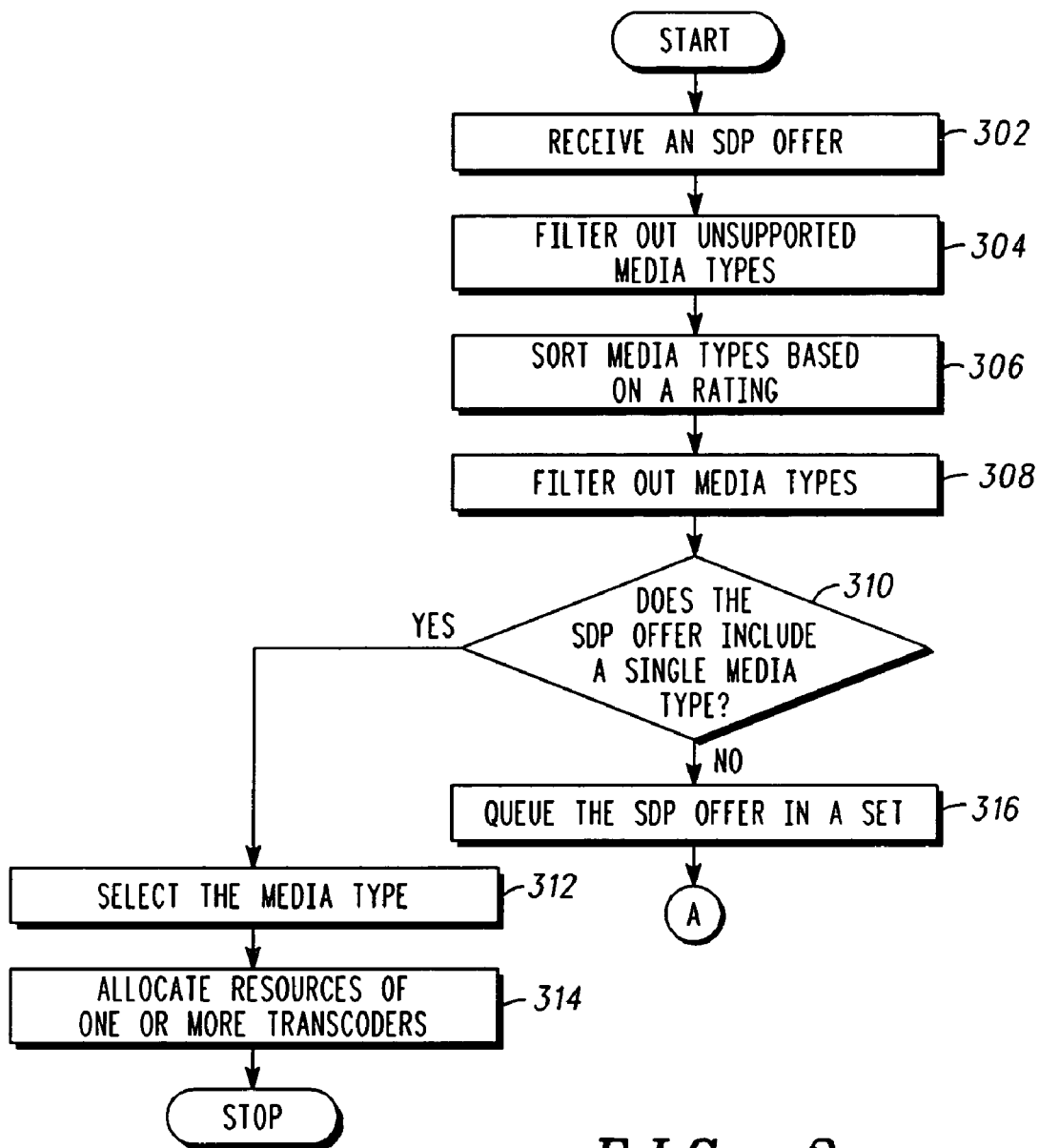
FIGS. 3 and 4 representatively illustrate a flowchart depicting a method for optimizing transcoder resources in a multimedia session, in accordance with a second exemplary embodiment of the present invention.
Figure 4:
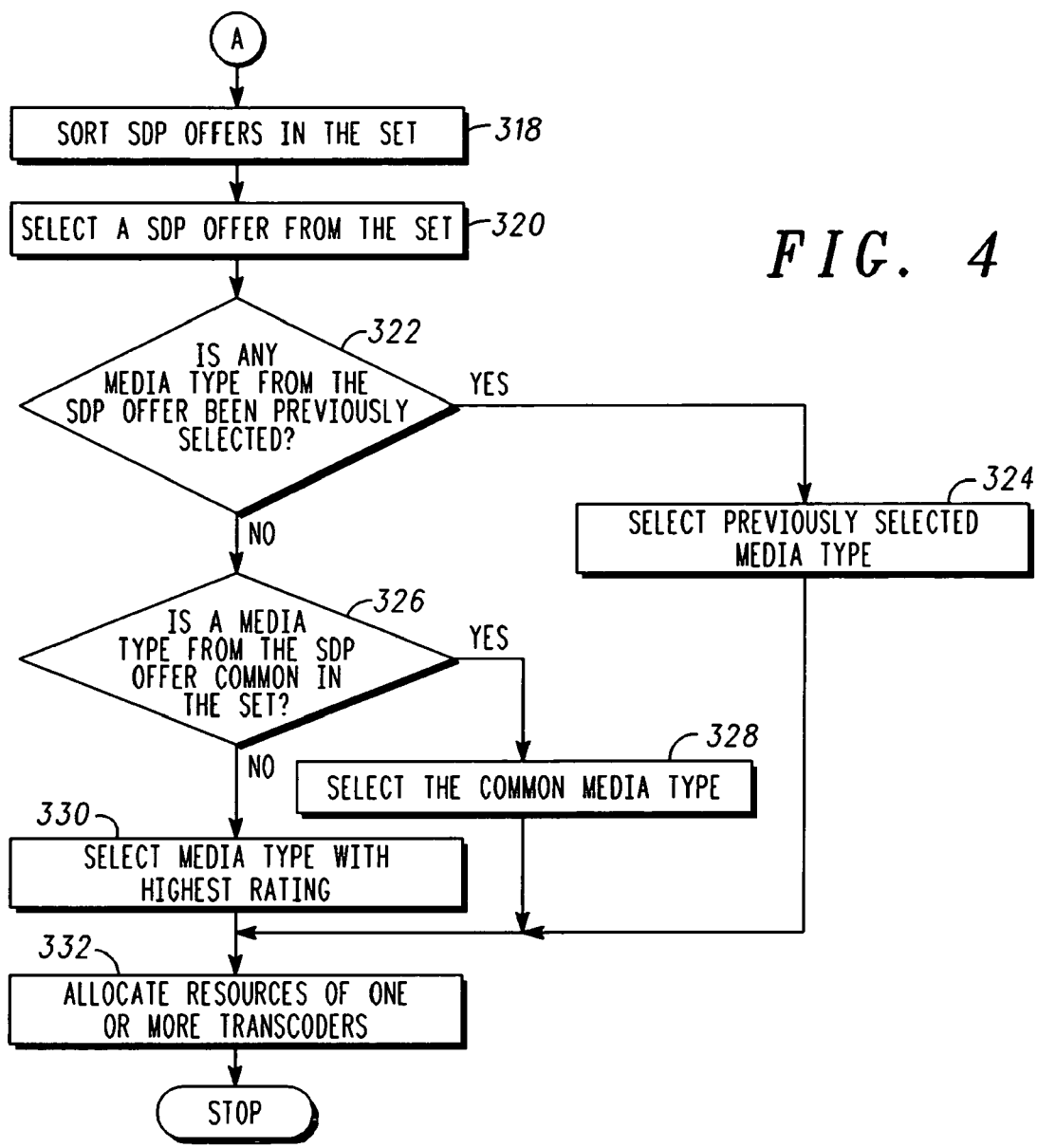

FIGS. 3 and 4 representatively illustrate a flowchart depicting a method for optimizing transcoder resources in a multimedia session, in accordance with a second exemplary embodiment of the present invention. At step 302, an SDP offer corresponding to one of the plurality of users 102 is received. The SDP offer lists different media types that can be used to establish a multimedia session for a user from the plurality of users 102. Each media type has a Mean Opinion Score (MOS) rating, as described in conjunction with FIG. 2.

At step 304, the media types that are not supported by the user are filtered out from the SDP offer. After filtering out the unsupported media types, the media types in the SDP offer are sorted based on the MOS rating, at step 306. At step 308, the media types that are not within an Acceptable Voice Quality Degradation (AVQD) factor from a highest rated media type are filtered out. In an embodiment of the invention, the highest rated media type is the media type with the highest MOS rating in the SDP offer. The AVQD factor is configurable. In an embodiment of the present invention, the AVQD factor is decreased in order to produce a high voice quality. In another embodiment of the present invention, the AVQD factor is increased in order to reduce the usage of the transcoder's resources.

After filtering out the media types based on the AVQD factor, the number of media types in the SDP offer is checked, at step 310. If the SDP offer contains a single media type, then that media type is selected, at step 312. In other words, the single media type is chosen for the user to establish the conference call. Thereafter, resources of one or more transcoders from the plurality of transcoders 106 are allocated, at step 314. The one or more transcoders convert the media type from one format to another. If, at step 316, the SDP offer contains more than one media type, the SDP offer is queued in a set, which is processed further. The steps 302 to 316 are iteratively performed for each SDP offer.

At step 318, the SDP offers in the set are sorted based on the MOS rating of the media types in the SDP offers. Thereafter, each SDP offer is further processed in the sorted order. At step 320, the SDP offer having the media type with the highest MOS rating is selected. At step 322, a check is performed to verify whether a media type in the selected SDP offer has been previously selected for a user from the plurality of users 102. If one of the media types in the SDP offer has been previously selected, then the previously selected media type is selected for the SDP offer, at step 324. In other words, the previously selected media type is chosen for the SDP offer. If no media type in the SDP offer has been previously selected, a check is made to verify whether a media type in the SDP offer is common to the media types listed in the SDP offers in the set, at step 326. If one of the media types in the SDP offer is common to the media types listed in the SDP offers in the set, then that media type is selected, at step 328. In other words, the common media type in the set is chosen for the SDP offer. If no media type in the SDP offers is common to any media type listed in the SDP offers in the set, then the media type with the highest MOS rating is selected, at step 330. After one of the media types is selected, resources of one or more transcoders from the plurality of transcoders 106 are allocated, at step 332. The one or more transcoders convert the media type from one format to another. In an embodiment, steps 318 thru 332 may be performed at a time after SDP offers have been collected in the set. In another embodiment, steps 320 through 332 may be iterative until all of the SDP offers in the set have been processed.

Figure 5:
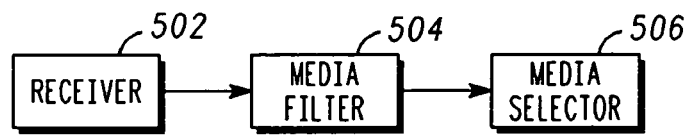
FIG. 5 representatively illustrates a block diagram showing a system for optimizing transcoder resources in a multimedia session, in accordance with an exemplary embodiment of the present invention.

FIG. 5 representatively illustrates a block diagram showing a system for optimizing transcoder resources in a multimedia session, in accordance with an exemplary embodiment of the present invention. The system 500 includes a receiver 502, a media filter 504, and a media selector 506. The receiver 502 receives one or more SDP offers. The one or more SDP offers include one SDP offer each from the plurality of users 102. Each SDP offer lists different media types supported by a user from the plurality of users 102.

Each media type has a rating. In an embodiment of the present invention, the rating is a Mean Opinion Score (MOS) rating. The MOS rating is a measure of audio clarity of a voice call. The MOS rating ranges from 1 to 5, where 5 is the highest quality level. In another embodiment of the present invention, the rating is a vocoder voice quality rating.

The media filter 504 filters the media types from each of the one or more SDP offers, received by the receiver 502, based on a rating range. In an embodiment of the invention, the rating range is based on an Acceptable Voice Quality Degradation (AVQD) factor. The media filter 504 filters out the media types that are not within the AVQD factor from a highest rated media type. In an embodiment of the invention, the highest rated media type is the media type with the highest MOS rating.

The media selector 506 selects one media type from each of the one or more SDP offers that are filtered by the media filter 504. The system 500 may further include a plurality of transcoders 106. After the media selector 506 selects one media type from each of the one or more media types, resources of one or more transcoders from the plurality of transcoders 106 are allocated. The one or more transcoders convert the media type from one format to another.

In an embodiment of the present invention, the system 500 can be used for half-duplex operations. In a half-duplex operation, one user transmits information and the other users receive or listen. In other words, it allows one-way communication between users. Examples of the half-duplex operation include messaging, paging, and, structured voice communication. In an embodiment of the present invention, the system 500 is used for half-duplex operation based dispatch calls.

In another embodiment of the present invention, the system 500 can be used for full-duplex operations. A full-duplex operation allows two-way communication between the users. For example, the system 500 may be used for a group call between diverse systems, based on full-duplex operation. Another example of full-duplex operation includes a telephonic conversation.

In yet another embodiment of the present invention, the system 500 is used in a gateway for an Integrated Digital Enhanced Network (iDEN). The iDEN supports both half-duplex and full-duplex voice call operations.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method for optimizing transcoder resources in a multimedia session, the multimedia session using a Session Description Protocol (SDP) offer, the SDP offer listing one or more media types, each media type having a rating, the method comprising:
   receiving one or more SDP offers from a plurality of user devices;
   filtering out the media types from each of the one or more SDP offers based on a rating range;
   queuing the SDP offer from the one or more SDP offers in a set if the SDP offer comprises more than one of the media types;
   sorting the one or more queued SDP offers in the set based on the rating of the media types listed in the one or more queued SDP offers;
   selecting one of the media types from each of the one or more SDP offers by processing each of the one or more queued SDP offers in the set based on the order of sorting;
   allocating resources of one or more transcoders for transcoding the one of the media types; and
   establishing multimedia session between the plurality of user devices using the allocated resources of the one or more transcoders.

2. The method of claim 1, wherein filtering out the media types comprises:
   filtering out unsupported media types from each of the one or more SDP offers; and
   sorting the media types based on the rating.

3. The method of claim 1, wherein if the SDP offer from the one or more SDP offers comprises a single media type, selecting the single media type from the SDP offer.

4. The method of claim 1, wherein selecting the one of the media types comprises:
   choosing one of the media types if the media type has been previously selected from the one or more SDP offers.

5. The method of claim 1, wherein selecting the one of the media types comprises:
   choosing one of the media types if the media type is common in the set.

6. The method of claim 1, wherein selecting the one of the media types comprises:
   selecting a highest rated media type.

7. The method of claim 1 further comprising:
   determining a Mean Opinion Score (MOS) for the one of the media types, wherein the MOS is equal to the rating of the one of the media types.

8. The method of claim 1 further comprising:
   setting the rating range within an Acceptable Voice Quality Degradation (AVQD) factor from the media type with highest rating.

9. The method of claim 8, wherein setting the rating range comprises:
   decreasing the AVQD factor in order to produce a high voice quality.

10. The method of claim 8, wherein setting the rating range comprises:
    increasing the AVQD factor in order to reduce the usage of the transcoder resources.

11. A method for optimizing transcoder resources in a multimedia session, the multimedia session using a Session Description Protocol (SDP) offer, the SDP offer listing one or more media types, each media type having a rating, the method comprising:

iteratively performing, receiving the SDP offer from a user device;

filtering out unsupported media types from the one or more media types in the SDP offer;

sorting the one or more media types of the SDP based on the MOS rating;

filtering out a media type from the one or more media types in the SDP if the MOS rating of the media type is not within an Acceptable Voice Quality Degradation (AVQD) factor from the media type with highest MOS rating;

if the SDP offer comprises a single media type after filtering then, selecting the single media type; and allocating resources of one or more transcoders for transcoding the media type; and if the SDP offer comprises more than one media types after filtering then, queuing the SDP offer in a set;

sorting the SDP offers in the set based on the MOS rating of its media types;

selecting the SDP offer from the set;

selecting a media type if the media type in the SDP offer has been previously selected;

selecting a media type if no media type from the SDP offer has been previously selected and the media type in the SDP offer is common in the set;

selecting a media type with highest rating if no media type in the SDP offer has been previously selected and no media type in the SDP offer is common in the set;

allocating resources of the one or more transcoders for transcoding the media type; and establishing multimedia session between the user device and at least one another user device using the allocated resources of the one or more transcoders.

12. The method of claim 11, wherein filtering out a media type comprises:

decreasing the AVQD factor in order to produce a high voice quality.

13. The method of claim 11, wherein filtering out a media type comprises:

increasing the AVQD factor in order to reduce the usage of transcoder resources.

* * * * *